US012566748B2

(12) United States Patent
Saxena et al.

(10) Patent No.: US 12,566,748 B2
(45) Date of Patent: Mar. 3, 2026

(54) SYSTEMS AND METHODS FOR SYSTEM EVENT CONFLICT IDENTIFICATION

(71) Applicant: Optum, Inc., Minnetonka, MN (US)

(72) Inventors: Priya Saxena, Gurgaon (IN); Vishal Batra, Gurgaon (IN)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/775,572

(22) Filed: Jul. 17, 2024

(65) Prior Publication Data

US 2026/0023736 A1 Jan. 22, 2026

(51) Int. Cl.
*G06F 16/23* (2019.01)
(52) U.S. Cl.
CPC ................................ *G06F 16/2365* (2019.01)
(58) Field of Classification Search
CPC ............. G06F 11/0787; G06F 11/0766; G06F 11/0769; G06F 11/079; G06F 11/004; G06F 11/30; G06F 16/2365
See application file for complete search history.

(56) References Cited

U.S. PATENT DOCUMENTS 8,762,180 B2 6/2014 Ghani et al.
10,489,502 B2 11/2019 Priestas et al.

| 2020/0004837 A1* | 1/2020 | Mohan | G06F 16/122 |
| 2020/0241949 A1* | 7/2020 | Basu | G06F 11/0775 |
| 2022/0187815 A1* | 6/2022 | Sinha | G05B 23/0281 |
| 2023/0084146 A1 | 3/2023 | Singh et al. | |
| 2023/0168989 A1* | 6/2023 | Chatterjee | G06F 11/0775 |
| | | | 714/25 |
| 2024/0086445 A1* | 3/2024 | Cakir | G06N 5/04 |
| 2025/0110822 A1* | 4/2025 | Parthasarathy | G06F 11/0709 |
| 2025/0225011 A1* | 7/2025 | Jacob | G06N 20/00 |

* cited by examiner

*Primary Examiner* — Robert W Beausoliel, Jr.
(74) *Attorney, Agent, or Firm* — Bookoff McAndrews, PLLC

(57) ABSTRACT

A computer-implemented method includes receiving first query data associated with a first query, identifying a system error that is associated with the first unique entity identifier based on an indication that the first query was improperly approved, extracting a cause of the system error from the first query data, determining a machine-readable invalidity code that corresponds to the cause of the system error, updating a system error database with the first unique entity identifier and the machine-readable invalidity code as a first pair, and outputting, the first pair including the first unique entity identifier and the machine-readable invalidity code from the system error database, the first pair being configured to be processed by a front-end system for identifying a potential system error associated with second query data for a second query.

20 Claims, 6 Drawing Sheets

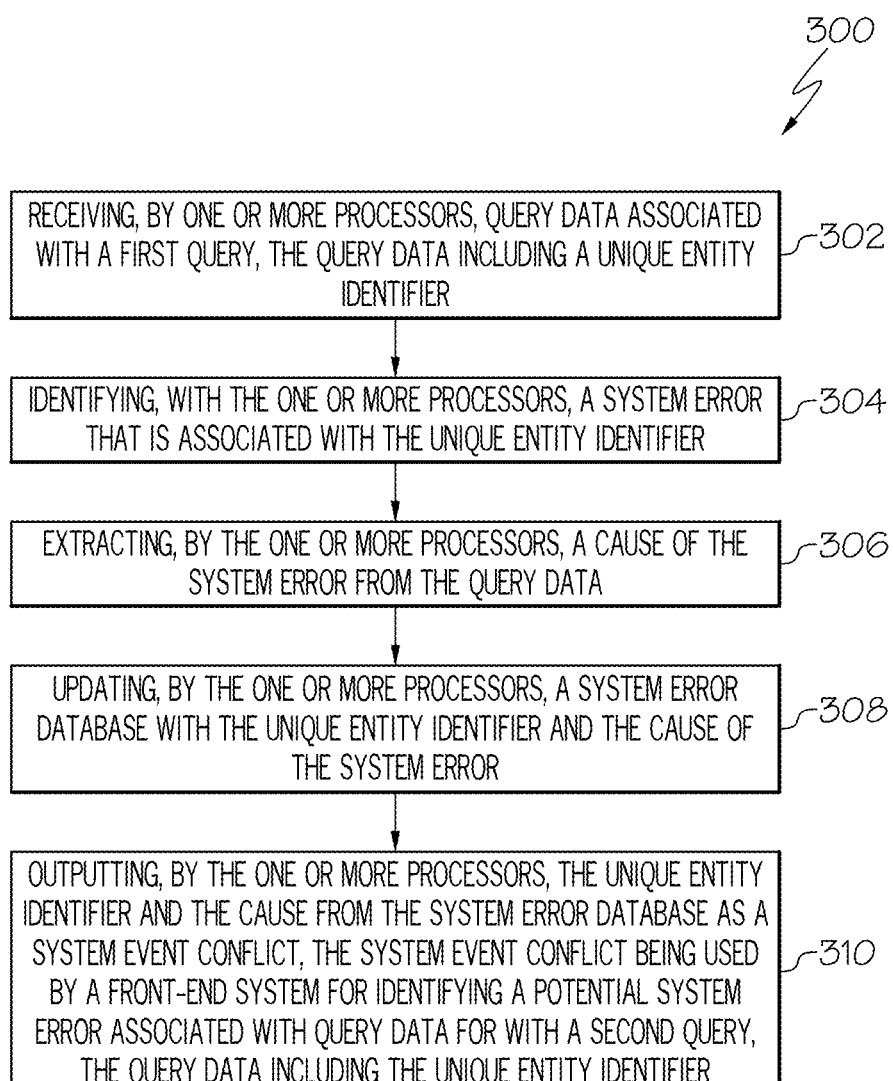

300

RECEIVING, BY ONE OR MORE PROCESSORS, QUERY DATA ASSOCIATED WITH A FIRST QUERY, THE QUERY DATA INCLUDING A UNIQUE ENTITY IDENTIFIER — 302

IDENTIFYING, WITH THE ONE OR MORE PROCESSORS, A SYSTEM ERROR THAT IS ASSOCIATED WITH THE UNIQUE ENTITY IDENTIFIER — 304

EXTRACTING, BY THE ONE OR MORE PROCESSORS, A CAUSE OF THE SYSTEM ERROR FROM THE QUERY DATA — 306

UPDATING, BY THE ONE OR MORE PROCESSORS, A SYSTEM ERROR DATABASE WITH THE UNIQUE ENTITY IDENTIFIER AND THE CAUSE OF THE SYSTEM ERROR — 308

OUTPUTTING, BY THE ONE OR MORE PROCESSORS, THE UNIQUE ENTITY IDENTIFIER AND THE CAUSE FROM THE SYSTEM ERROR DATABASE AS A SYSTEM EVENT CONFLICT, THE SYSTEM EVENT CONFLICT BEING USED BY A FRONT-END SYSTEM FOR IDENTIFYING A POTENTIAL SYSTEM ERROR ASSOCIATED WITH QUERY DATA FOR WITH A SECOND QUERY, THE QUERY DATA INCLUDING THE UNIQUE ENTITY IDENTIFIER — 310

FIG. 3

| INVALIDITY CODE | INVALIDITY CAUSE |
|---|---|
| ACTIVITY_PRIOR_TO_RELEVANT_PERIOD | TIMESTAMP ERROR, COVERAGE ERROR |
| ACTIVITY_AFTER_RELEVANT_PERIOD | |
| ENTITY_INFO_INCONSISTENT_WITH_FRONT_END_INFO | ENTITY IDENTIFICATION, AUTHORIZATION, PRECERTIFICATION MISMATCH |
| AUTH_NAME_DISCREPENCY | |
| META_DATA_INCORRECT | KNOWN DATA VALUE INCORRECT |
| UNEXPECTED_QUERY | QUERY ISSUED IN ERROR |
| UNIQUE_IDENTIFIER_DATA_MISMATCH | UNIQUE IDENTIFIER AND/OR ASSOCIATED DATA MISSING OR INVALID |

| ENTITY INFO | INVALIDITY CODE |
|---|---|
| ENTITY_1_EVENT_1 | ACTIVITY_PRIOR_TO_RELEVANT_PERIOD |
| ENTITY_1_EVENT_2 | AUTH_NAME_DISCREPENCY |
| ENTITY_1_EVENT_3 | <NO ERROR> |
| ENTITY_1_EVENT_4 | UNIQUE IDENTIFIER AND/OR ASSOCIATED DATA MISSING OR INVALID |

SYSTEMS AND METHODS FOR SYSTEM EVENT CONFLICT IDENTIFICATION

TECHNICAL FIELD

The present disclosure relates generally to the field of data processing, data analytics, and system event detection. In particular, the present disclosure relates to processing data to identify system event conflicts.

BACKGROUND

Computing systems are deployed for use in various data processing applications. For example, computing systems are used to authorize entry into a secure location or access to a secure system, conduct transactions, facilitate transportation, generate documents, or deliver video and audio. These and other systems, while generally reliable, experience errors over time. Errors can be introduced by software or hardware entities or are introduced by a human entity via operator error.

While context-dependent strategies exist for identifying and correcting some errors, not every error is correctly identified or identified in a timely manner. For example, some errors are time-sensitive. These time-sensitive errors, if not identified contemporaneously or shortly after their occurrence, have negative impacts on downstream actions or computations. As an example, a computing system receives a query, such as a request for an authorization, a registration, or a notification of an event. In response to the query, the system proceeds with an approval, registration, or event log, despite the existence or risk of a conflict, the system failing to identify the conflict despite the occurrence of a similar conflict or the same conflict resulting from a prior query. If the query is processed before the error is identified, the issuance of the approval, registration, event log, or other action can have negative impacts that require remedial action, additional computation power, and/or cost.

SUMMARY OF THE DISCLOSURE

The present disclosure solves technical challenges typically encountered during the use of conventional methods for identifying system event conflicts, such as those discussed above. Specifically, the present disclosure solves the technical challenges by providing a system that extracts, summarizes, and analyzes data associated with previous system errors and draws correlations between current system events and previous errors.

In some aspects, the techniques described herein relate to a computer-implemented method including receiving, by one or more processors, first query data associated with a first query, the first query data including a first unique entity identifier, identifying, by the one or more processors, a system error that is associated with the first unique entity identifier based on an indication that the first query was improperly approved, extracting, by the one or more processors, a cause of the system error from the first query data by applying one or more text-analyzing algorithms to narrative text included in the first query data, determining, by the one or more processors, a machine-readable invalidity code that corresponds to the cause of the system error by comparing the cause of the system error with a set of machine-readable invalidity codes, updating, by the one or more processors, a system error database with the first unique entity identifier and the machine-readable invalidity code as a first pair, and outputting, by the one or more processors, the first pair including the first unique entity identifier and the machine-readable invalidity code from the system error database, the first pair being configured to be processed by a front-end system for identifying a potential system error associated with second query data for a second query.

In some aspects, the techniques described herein relate to a system including one or more processors of a computing system and at least one non-transitory computer readable medium storing instructions which, when executed by the one or more processors, cause the one or more processors to perform operations including receiving first query data associated with a first query, the first query data including a first unique entity identifier, identifying a system error that is associated with the first unique entity identifier based on an indication that the first query was improperly approved, extracting the cause of the system error from the first query data by applying one or more text-analyzing algorithms to narrative text included in the first query data, determining a machine-readable invalidity code that corresponds to the cause of the system error by comparing the cause of the system error with a set of machine-readable invalidity codes, updating a system error database with the first unique entity identifier and the machine-readable invalidity code as a first pair, and outputting the first pair including the first unique entity identifier and the machine-readable invalidity code from the system error database, the first pair being configured to be processed by a front-end system for identifying a potential system error associated with second query data for a second query.

In some aspects, the techniques described herein relate to a non-transitory computer readable medium, the non-transitory computer readable medium storing instructions which, when executed by one or more processors of a computing system, cause the one or more processors to perform operations including receiving first query data associated with a first query, the first query data including a first unique entity identifier, identifying a system error that is associated with the first unique entity identifier based on an indication that the first query was improperly approved, extracting cause of the system error from the first query data by applying one or more text-analyzing algorithms to narrative text included in the first query data, determining a machine-readable invalidity code that corresponds to the cause of the system error by comparing the cause of the system error with a set of machine-readable invalidity codes, and updating a system error database with the first unique entity identifier and the machine-readable invalidity code as a first pair; and outputting the first pair including the first unique entity identifier and the machine-readable invalidity code from the system error database, the first pair being configured to be processed by a front-end system for identifying a potential system error associated with second query data for a second query.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

FIG. 3 is a flowchart for system event conflict detection, according to aspects of the disclosure.

FIGS. 4A and 4B are tables showing example invalidity codes, invalidity causes, and entity information.

DETAILED DESCRIPTION OF EMBODIMENTS

Figure 1:
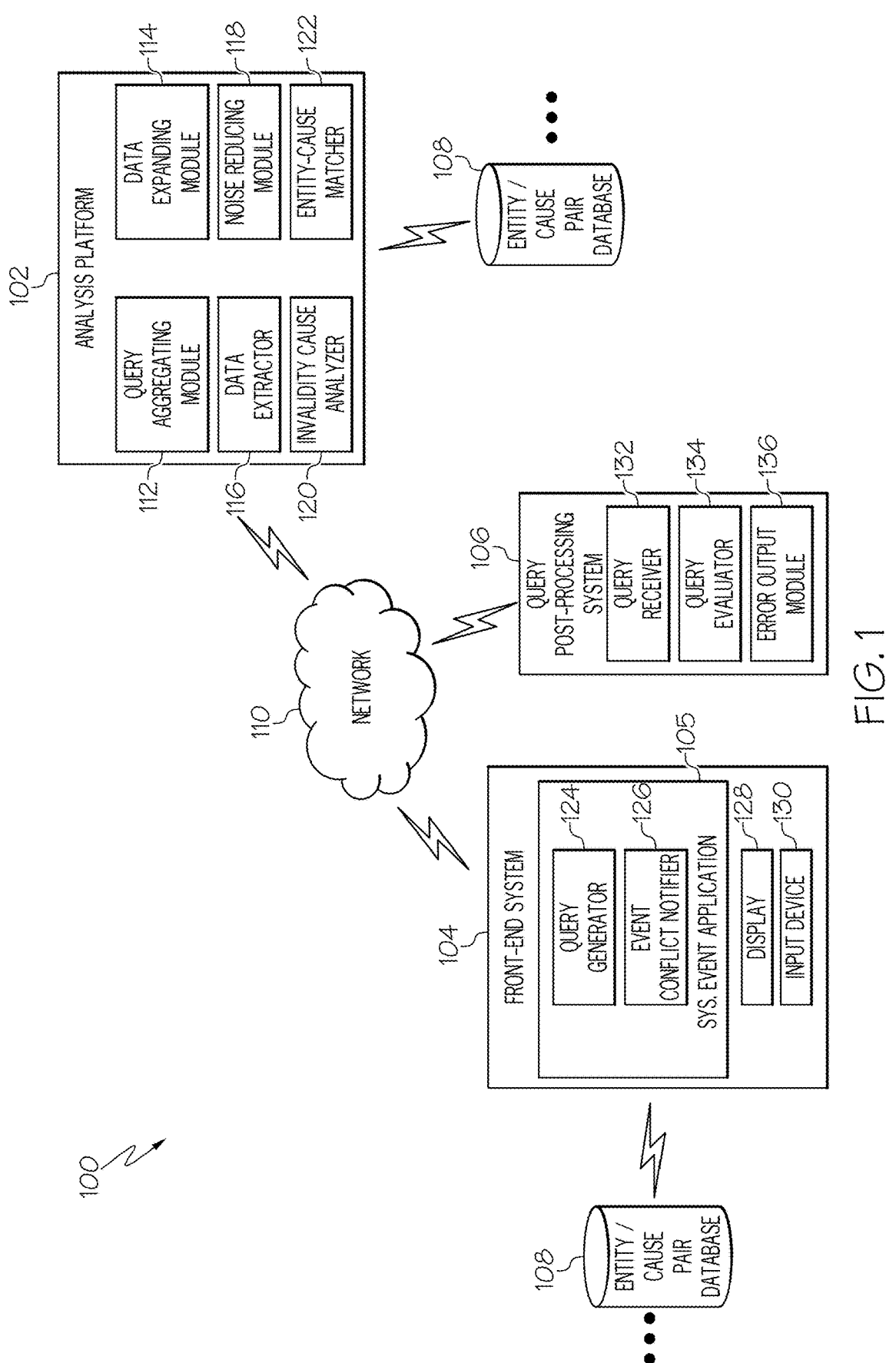
FIG. 1 is a diagram showing an example of a system for system event conflict detection, according to aspects of the disclosure.

This present disclosure relates generally to the field of data processing, data analytics, and system event detection. In particular, the present disclosure relates to processing data to identify system event conflicts, such as a query that is initially approved or processed and later rejected or returned.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the embodiments are not to be considered as limited by the foregoing description.

Various non-limiting embodiments of the present disclosure will now be described to provide an overall understanding of the principles of the structure, function, and use of systems and methods disclosed herein for system event conflict detection.

Conventional methods fail to reliably identify system event conflicts, as some may not be immediately identifiable as an error, the error being apparent only during downstream processing. It is technically challenging, for example, to develop techniques that account for different types of system event conflicts (e.g., to determine that a query that is associated with a system event should be corrected or otherwise revised prior to additional analysis, approval, or other downstream processing).

For example, to identify event conflicts, such as an approval for a query that should be denied, conventional methods utilize remedial actions rather than preventative analyses. Conventional methods allow each conflict to occur, due to an inability to analyze prior events and extract relevant reasons for denial, with the error being addressed via additional downstream analyses. This process is repeated, even when a particular entity is associated with multiple errors.

The present disclosure provides embodiments that address the above shortcomings in fields involving error analysis. For instance, system(s) of environment 100 overcome the technical shortcomings of the conventional techniques which involve taking remedial action for each error. In contrast, the system(s) of environment 100 prevent errors by identifying entity and system error cause pairs via modeling techniques, processing algorithms, or other analytical mechanisms, the pairs being used to prevent entities from generating future errors, as described below.

For example, system(s) of environment 100, employing the techniques described herein, facilitate identification of a system error that is associated with a machine-readable invalidity code. This is performed without the need to supply system(s) of environment 100 with the machine-readable invalidity code. In particular, a cause of the system error is extracted, the extracted cause being used to identify the machine-readable invalidity code, enabling downstream automations and analyses.

In examples, text-analyzing algorithms and other analytical techniques convert query data that is not machine-readable (e.g., that does not provide encoded information that is recognizable by a conventional error-detection system) to one or more machine-readable invalidity codes (e.g., by identifying an invalidity code that corresponds to one or more invalidity causes represented in the query data). Text-analyzing algorithms process text, such as narrative text, by techniques including data expansion, noise reduction, Natural Language Processing, modeling (e.g., QA modeling), and others, in contrast to conventional methods in which narrative text (text or other data which is not machine readable, not formatted for machine recognition, dump logs, human-entered data, etc.) for an error is manually reviewed and analyzed. Analytical techniques convert narrative text to machine-readable codes that are suitable for downstream processing.

The use of a system error database consolidates previous analytical outputs for identifying future potential system errors. The system error database is updated to provide an expansive archive of system error causes paired with unique entity identifiers. This pairing facilitates the identification of future potential system errors introduced by a common unique entity, for example, by way of providing updated entity identifier/system error cause pairs, in contrast to conventional systems in which data extraction and consolidation techniques are not employed and system errors are instead individually coded at a single point in time.

Potential system errors are identified for second and subsequent inquiries, without the need to generate additional narrative text, in at least some configurations. Potential system errors are identified before the second and subsequent query is granted or otherwise authorized, preventing the occurrence of second and subsequent system errors. This improves the efficiency of the system(s) of environment 100, allowing correct queries to proceed to authorization and preventing errors from occurring, reducing computational load and providing other technical benefits. Potential system errors can be identified in real-time or near real-time, and are output to a system and/or for display to identify the potential error immediately or promptly (e.g., in real-time or near real-time) after the second or subsequent query is generated, preventing processing delays in contrast to conventional techniques where remedial actions are necessary after the occurrence of each system error.

The above technical improvements, and additional technical improvements, will be described in detail throughout the present disclosure. Also, it should be apparent to a person of ordinary skill in the art that the technical improvements of the embodiments provided by the present disclosure are not limited to those explicitly discussed herein, and that additional technical improvements exist.

FIG. 1 shows an example system environment 100 in which an analysis platform 102, a front-end system 104, and a query post-processing system 106 are deployed. Environment 100 includes a network 110 and an entity/invalidity cause pair database 108 (also referred to herein as "error database 108," such as a dictionary or repository of error causes). In the example configuration of FIG. 1, two entity/invalidity cause pair databases 108 are shown. In examples, including the example shown in FIG. 1, the two depictions of error databases 108 correspond to a single error database 108 (as represented by ellipses in FIG. 1). In these and other examples, analysis platform 102 controls one or more aspects of front-end system 104 (e.g., system event application 105) via error database 108. In other examples, a first error database 108 is in communication with analysis platform 102 and a second error database 108 is in communication with front-end system 104. Each entity/invalidity cause pair stored in database 108 represents a previous system event conflict, as described below.

In some embodiments, front-end system 104 represents a computing system in which system errors occur and/or in which causes of system errors are generated. These errors are associated with queries, examples of which are described below. Query post-processing system 106 represents a computing system in which queries are received and evaluated as causes of system errors. Analysis platform 102 aggregates queries from front-end system 104 and/or query post-processing system 106, match entities with system errors caused by the queries, analyze causes of the system errors, and update invalidity pair database 108 when system errors are identified.

The example configuration of analysis platform 102 shown in FIG. 1 includes a query aggregating module 112, a data expanding module 114, a data extractor 116, a noise reducing module 118, an invalidity cause analyzer 120, and an entity-cause matcher 122. The components of analysis platform 102 enable analysis platform 102 to analyze queries that resulted in system errors. This analysis includes receiving query data, which includes one or more unique entity identifiers as well as error data. This error data is in the form of coded data (e.g., a log, data dump, and/or narrative text). The coded data includes, for example, abbreviations, acronyms, hexadecimal codes, other alphanumeric codes, etc. The error data is analyzed to determine the cause of a system error (e.g., an invalid query) and match an entity identifier with the system error.

Query aggregating module 112 allows analysis platform 102 to receive queries from one or a plurality of query post-processing systems 106. These queries include corresponding query data, and may be received via direct communication between analysis platform 102 and query post-processing system 106, or communication via network 110, as shown in FIG. 1. Query aggregating module 112 communicates with one or more databases to store, update, and retrieve queries from query post-processing system 106.

Data expanding module 114 is configured to process query data received and aggregated with query aggregating module 112. As described above, the query data, in at least some examples, includes coded data. This coded data encompasses logs (e.g., error logs), data dumps (e.g., snapshots of a system's state when an error occurred), or narrative text. Narrative text, in some examples, includes text that was manually input via query post-processing system 106. This narrative text includes documentation generated according to prior processing and includes an identification and description of an error.

Data extractor 116 is configured to retrieve queries and query data aggregated with query aggregating module 112. Data extractor 116 retrieves query data based on, for example, the identification of a system error. The system error identification was performed with query post-processing system 106 or another suitable system, as described below. In other examples, data extractor 116 retrieves query data for all available queries associated with a particular entity or for a plurality of entities. This enables analysis platform 102 to gather an entities complete history, in text format or another format, for downstream processing of invalidity causes.

Data expanding module 114 identifies coded language that is not compatible with downstream processing, such as processing performed with analyzer 120. Data expanding module 114, in some configuration, includes programming to identify abbreviations, acronyms, hexadecimal codes, other alphanumeric codes, and other coded language that is present in the query data. Once identified, the coded language is converted to a format that is suitable for analysis with analyzer 120. In the examples of abbreviated language, the codes "chrge," "chrg," or "chgs," are converted to the word "charges" or a corresponding machine-readable code. Other examples of abbreviated language and acronyms include error numbers (e.g., hardware identification codes, HTTP error codes, driver codes, network errors, boot log codes, etc.).

Noise reducing module 118 employs one or more algorithms for further processing query data. This processing reduces downstream computational requirements by removing unnecessary information in the query data that is not necessary for invalidity cause identification. This unnecessary data is considered noise as it is not needed, and in some cases is not beneficial, for identifying error causes. For example, when the query data includes narrative text noise, reducing module 118 removes data that is not narrative text, exporting the narrative text itself or a summary of the narrative text that was generated with a summarization algorithm.

Invalidity cause analyzer 120 is configured to receive data output from noise reducing module 118. This data is analyzed by an algorithm tailored for the invalidity causes that are expected to be present in the query data. In the example of narrative text or a narrative text summary, analyzer 120 employs a Natural Language Processing ("NLP") algorithm, a plurality of NLP algorithms, and/or other types of text-analyzing algorithms. An example NLP algorithm is a Question-Answering ("QA") model. In some aspects, the QA model is configured to retrieve answers for preset question(s), such as "what led to the invalidity of the query?" or "what is the reason for the invalidity of the query?" These questions are set via basis prompt engineering methods.

In some aspects, topic modeling techniques is performed with analyzer 120. For example, topic modeling is performed on a sample of narrative text, resulting in similar clusters that are labelled with one or more keywords. If desired, a regex algorithm is performed on the clusters (e.g., due to the presence of one or more impure clusters). Labelled data is suitable for use for text classification of further query data.

In some configurations, invalidity cause analyzer 120 uses two or more techniques. These techniques are used sequentially, if desired, such as using the output from the QA model as an input for the topic modelling technique, or the reverse process.

The answer or other output of an NLP algorithm or other suitable algorithm corresponds to a particular invalidity cause. Analyzer 120 outputs, for example, a standardized identifier, such as a machine-readable invalidity code, as an invalidity cause. This allows similar or identical invalidity causes, or errors, to be identified.

The invalidity causes identified with analyzer 120 are output to entity-cause matcher 122. Entity-cause matcher 122 compiles each invalidity cause and identifies the entity associated with the invalidity cause. Each individual entity is associated with one or a plurality of errors in a matched list of entity-cause pairs, the list of pairs being generated with entity-cause matcher 122. This list of entity-cause pairs is suitable to store or update entity and cause pairs stored in error database 108.

Front-end system 104 includes a system event application including a query generator 124 and an event conflict notifier 126. Front-end system 104 further includes a display 128 and an input device 130.

System event application 105 is configured to generate queries with query generator 24 when application 105 is in operation. Display 128 and input device 130 allow a user to interact with system event application 105. In some examples, events are generated with query generator 124 based on signals from display 128, input device 130, or other components of front-end system 104.

Queries generated with query generator 124 includes internal computing system events, or events involving multiple computing systems. Device interactions (e.g., via one or more system drivers), memory interactions, and storage interactions are examples of internal system events that are suitable for inclusion in a query. Events involving multiple computing system include, for example, HTTP communications, API calls, video communications, audio communications, messaging services, and others. In the example of healthcare applications, the query may represent a communication, such as a communication from a healthcare service provider to a claim authorizer.

Event conflict notifier 162 is configured to generate a notification or take other corrective action. For example, a query from query generator 124, the query being associated with a particular entity, is compared to prior entities and errors (e.g., represented by machine-readable invalidity codes) stored as pairs in error database 108. When the query matches a past query (e.g., the current query matches a stored query and the same entity is associated with both queries), event conflict notifier 126 causes a notification to be displayed via display device 128. This provides information to a user that facilitates correction of a potential error, troubleshooting, and/or remedial actions that can correct or avoid the error.

Query post-processing system 106 includes a query receiver 132, a query evaluator 134, and an error output module 136. In some aspects, query post-processing system 106 is a system configured for manual and/or automated review of queries generated with query generator 124. These queries were approved previously by query generator 124, with some queries being erroneously approved. Query post-processing system 106 is configured to identify these errors, or identify downstream errors that result due to the approval of the query.

In examples, query receiver 132 is in communication with front-end system 104, and in particular, with system event application 105. Query receiver 132 receives queries from query generator 124. These queries are in the form of query data, which includes an entity identifier (e.g., a unique identifier that identifies a user, a subject of a query, a hardware component, a software component, etc.) and information useful for handling the query (e.g., registration details, entity authorization information, precertification or preapproval information, timestamp data, reason for query issuance, action requested in response to query, query metadata, etc.).

Query evaluator 134 determines whether the query from query generator 124 should be rejected. When the query results in a system error (e.g., the action requested by the query was improperly approved, or the information for handling the query is incorrect) query evaluator 134 is configured to identify the error. The identification of an error may be performed in an automated manner, or manually (e.g., by user review of one or more queries). If desired, query evaluator 134 also identifies correctly-handled queries, but this step may be omitted to reduce computational load. Error output module 136 receives queries that result in system errors, and outputs error information to analysis platform 102 for further processing. The error information output from error output module 136 may include an indication (e.g., the query data, data extracted from the query data, data generated by manual or automated review following approval of the query, etc.) that the first query was improperly approved.

In the example illustrated in FIG. 1, various elements of the environment 100 communicate with each other through communication network 110. Network 110 represents a variety of different communication protocols and communication techniques. In one embodiment, network 110 facilitates communication between analysis platform 102, front-end system 104, and/or query post-processing system 106. Network 110 of environment 100 includes one or more networks such as a data network, a wireless network, a telephony network, or any combination thereof. It is contemplated that the data network is any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network is, for example, a cellular communication network and employs various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

Figure 2:
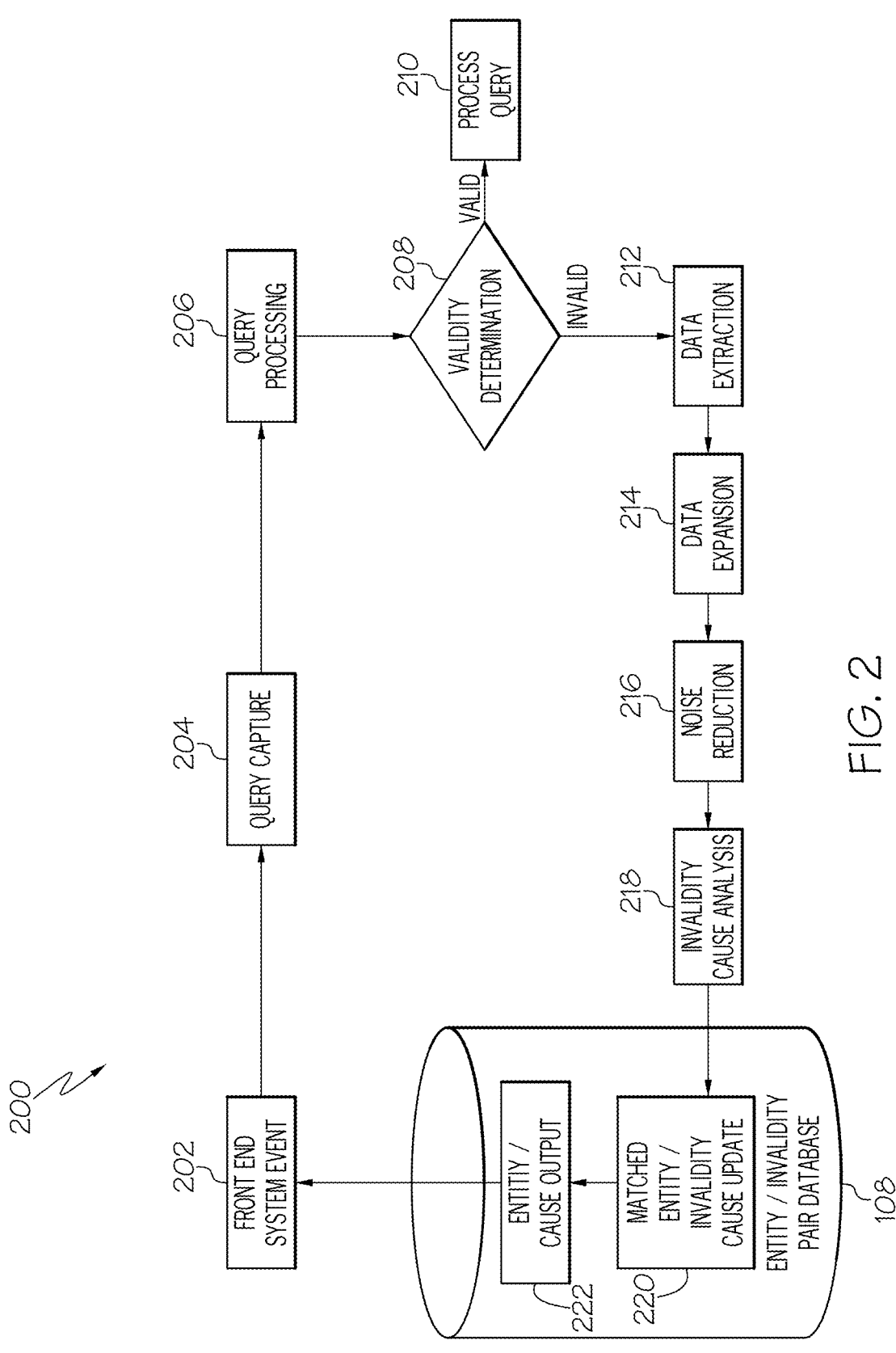
FIG. 2 is a flowchart for system event conflict detection, according to aspects of the disclosure.

The operation of the components included in environment 100 are described with respect to processes 200 and 300, which are represented by the flowcharts in FIGS. 2 and 3, respectively.

As shown in FIG. 2, process 200 includes a step 202 in which a front end system event occurs. This system event includes the generation of a query with query generator 124, as described above. In some examples, the query is approved in step 202 (e.g., an initial approval subject to later validation). In other examples, the query is processed, but neither approved nor denied in step 202.

A step 204 includes capturing the query generated as part of the front end system event of step 202. The query capture may be performed when system event application 105 transmits query data to analysis platform 102 and/or query post-processing system 106 via front-end system 104. Step 204 includes identifying, with query receiver 132 of query post-processing system 106 or with system 104, when a query is issued and logging query data for future analysis or transmission. In a particular example, step 204 captures queries related to requests for an authorization, a registration, or a notification of an event. Queries are captured for downstream review, including manual review, automated review, or both.

A step 206 includes processing one or more of the queries that were captured in step 204 with query evaluator 134. Step 206 includes evaluating queries that were received with query receiver 132 to determine if the query was appropriately handled by front-end system 104. Step 206 further includes identifying a system error associated with a unique entity identifier based on an indication that one or more queries were improperly approved. This identification of a system error is performed with analysis platform 102, and in particular, with query aggregating module 112 in response to receipt of the notification or corresponding data from error output module 136.

A determination 208 associated with step 206 proceeds to step 210 when the query was handled correctly or when the query was correctly issued and was a valid query. Step 210 includes processing a query by performing one or more downstream actions (e.g., completing a registration, permitting user access to a resource, completing a transaction, authorizing an electronic transfer, providing API access, communicating with one or more hardware devices, etc.).

When processing performed in step 206 determines that the query was invalid (e.g., the query was issued in error, contains a timestamp error, coverage error, or other cause of invalidity described herein) 212 is performed. Step 212, alone or in conjunction with steps 214, 216, 218, described below, is performed with analysis platform 102 to identify a cause for the determination 208 resulting in invalidity. These and other steps are performed with data analytic techniques, enabling for identification of the cause of invalidity, even in circumstances where steps 206 and 208 are performed manually (e.g., in systems where at least some errors are identified by manual review).

In step 212, data extraction is performed with data extractor 116 of analysis platform 102. In examples where steps 206 and 208 are performed manually, step 212 extracts manual inputs (e.g., narrative text). The narrative text, together with other query data such as a unique entity identifier for the query processed in step 206, is extracted and converted to a form suitable for further processing, example processing being described below.

A step 214 includes expanding query data with data extractor 116 of analysis platform 102. Noise reducing module 118, for example, identifies coded language, abbreviations, acronyms, hexadecimal codes, or other coded language as described above. In some examples, step 214 includes expanding only relevant data with data extractor 116.

A step 216 is performed with noise reducing module 118 to reduce the quantity of data stored and/or processed further. In some examples, step 216 removes irrelevant data and retains at least narrative text, timestamp data, an entity identity, metadata, and/or other types of data included in the query data.

A step 218 includes processing query data (e.g., narrative text) that was extracted in step 212, expanded in step 214, and reduced (e.g., summarized or otherwise de-noised) in step 216. Step 218 includes determining the cause or causes for the determination of invalidity with invalidity cause analyzer 120 of analysis platform 102. As described above, invalidity cause analyzer 120 is configured to employ text-analyzing algorithms, such as NLP algorithms, in particular a QA model, to identify the cause of invalidity included in the data of the narrative text. The invalidity cause, which is also referred to herein as a cause of a system error, is associated with a machine-readable invalidity code that is matched to the data included in the narrative text in step 218.

In some examples, a machine-readable invalidity code is determined by accessing a library of machine-readable invalidity codes and identifying the invalidity code that corresponds to the cause or causes determined with invalidity cause analyzer 120. In particular, the library or database of machine-readable invalidity codes are compared with the cause of the system error that was determined with NLP algorithms or other analytic techniques. The determined machine-readable invalidity code is then matched with the unique entity identifier for the cause of invalidity. This match is also referred to herein as a "pair," each pair including a unique entity identifier and one or more machine-readable invalidity codes that correspond to a particular cause of invalidity.

The pair(s) identified in step 218 are output to error database 108 in a step 220. In some examples, step 220 includes outputting, with entity-cause matcher 122, the cause that was identified in step 218 with the entity associated with the invalidity. Step 220 includes updating an error database 108 associated with or included in analysis platform 102, or updating an error database 108 associated with or included in front-end system 104, as shown in FIG. 1. Updating the database 108 with a cause of a system error encompasses at least one of storing the invalidity cause itself (e.g., a string of text) with database 108, storing the machine-readable code for the invalidity cause with database 108, or storing data representing both the cause and the corresponding code with database 108. Similarly, outputting a cause of a system error encompasses outputting the invalidity cause itself, outputting the machine-readable code for the invalidity cause, and/or outputting both the cause and the corresponding machine-readable code.

A step 222 includes outputting the entity and invalidity cause as a matched pair. As shown in FIG. 1, the entity/cause pair is output to, or otherwise provided to, system event application 105 of front-end system 104. This allows system event application 105 to predict, intercept, and prevent future errors. For example, event conflict notifier 126 generates a notification when an entity/cause pair that was output in step 222 occurs a second time in a future front end system event (e.g., in a future performance of step 202). The notification includes the cause of the system error or other information useful for preventing future system event conflicts. The notification in some examples identifies the specific entity that is expected to be the cause of the system error. In embodiments where the likelihood of a system error is determined (e.g., an error risk score described below with respect to FIG. 5), a qualitative or quantitative likelihood or confidence level is displayed or otherwise output.

With reference to FIG. 3, process 300 includes a step 302 of receiving, by one or more processors, query data associated with a first query, the query data including a unique entity identifier. This step corresponds to, for example, step 204 and/or functionality provided with query aggregating module 112 to receive queries from front-end system 104 or query post-processing system 106. In some aspects, step 302 includes receiving queries with system event application 105 or query receiver 132.

During step 302, query data for a first query includes a unique entity identifier, this identifier matching a user, account, item of hardware or software, address, memory address, etc. The query data also includes information related to the query itself, examples of which are described above.

A step 304 of process 300 includes, in some examples, identifying, with the one or more processors, a system error that is associated with the unique entity identifier. Step 304 includes identifying the occurrence of a system error by performing steps one or more of steps 206-212, for example.

A step 306 of process 300 includes extracting the cause of the system error from query data by applying one or more text-analyzing algorithms to narrative text included in the first query data. Step 306 is implemented, for example, by performing one or more of steps 208-218, as described above. In particular, step 306 includes identifying a cause of the system error, also referred to as an invalidity cause, by performing step 218 with analyzer 120. The cause of the system error is identified with one or more NLP techniques or other text-analyzing algorithms. Additionally or alternatively, the cause of the system error is identified with the use of one or more machine learning techniques or other suitable analytical processes.

Step 306 includes, in some embodiments, determining a machine-readable invalidity code by comparing the cause of the system error with a set of machine-readable invalidity codes. This is performed by retrieving potential machine-readable codes from a database or other library and matching one of the codes with the cause, as described above with respect to step 218 of process 200.

The cause of the system error identified in step 304 is used to update a system error database in a step 308. This is performed as described with respect to step 220, in which error database 108 is updated with a matched entity and invalidity cause pair. In particular, entity-cause matcher 122 of analysis platform 102 updates one or more error databases 108, such as a first database 108 for analysis platform 102 or a second database for front-end system 104.

A step 310 includes outputting, by the one or more processors, the unique entity identifier and the cause (e.g., the above-described machine-readable code) from the system error database as a pair. Step 310 also includes, in some examples, outputting a pair in a data format suitable for being used by a front-end system for identifying a potential system error associated with query data for a second query. The query data for the second query includes, in examples, the same entity identifier as the query data for the first query described above with respect to step 302. For example, step 310 includes identifying a single entity identifier associated with the cause of a system error resulting from a first query, the same entity identifier associated with a later query that is the same or similar to the first query.

The pair output in step 310 corresponds to step 222. In examples, the system event conflict includes an invalidity code 402 (FIG. 4A) that forms the machine-readable version of an invalidity cause 404, as described below. The invalidity cause 404 is, for example, the output generated with the above-described text-analyzing algorithms. The system event conflict, represented in the pair output in step 310, corresponds to a query that was approved or otherwise permitted to proceed, a later determination finding that the query should have been denied. Thus, the approval was invalid, resulting in a system error, the system event conflict indicating that the initial approval was incorrect.

Once output, the pair(s) are suitable for use, by system event application 105, for identifying future front end system events that should be denied to prevent future system error(s). With reference to FIG. 4A, example invalidity data 400 includes machine-readable invalidity codes 402 such as: ACTIVITY_PRIOR_TO_RELEVANT_PERIOD, ACTIVITY_AFTER_RELEVANT_PERIOD, ENTITY_INFO_INCONSISTENT_WITH_FRONT_END_INFO, AUTH_NAME_DISCREPENCY, META_DATA_INCORRECT, UNEXPECTED_QUERY, and UNIQUE_IDENTIFIER_DATA_MISMATCH. These invalidity codes correspond to one or more invalidity causes 404, as shown in FIG. 4A, and are matched with data of the narrative text (e.g., summarized narrative text) to determine which invalidity code 402 corresponds to the invalidity cause associated with the first query. While text strings are illustrated in FIG. 4A, the machine-readable code is in any suitable format, such as a numerical string, hexadecimal value, integer, etc.

One example of an invalidity cause 404 is a timestamp error or coverage error (e.g., the timestamp contained in the query data does not correspond to an expected time, the timestamp is outside of a period of time during which queries are permitted).

Another example of an invalidity cause 404 is an entity identification, authorization, or precertification mismatch error. This occurs when the entity identifier, such as an entity name, issued into front-end system 104 is different from an expected entity identifier. This difference could be a single value (e.g., a single character) in some occurrences, or based on a number of different values in other occurrences. This invalidity cause in some examples corresponds to an improperly-granted authorization, lack of an authorization, or erroneous precertification.

Additional causes 404 of invalidity, as shown in FIG. 4A, include metadata containing a value that is known to be incorrect, a query that was not expected and issued in error (e.g., a query is issued when no query was determined to be necessary), or a unique identifier that is itself missing or invalid or is associated with entity data that is missing or invalid.

FIG. 4B illustrates example invalidity data 450 associated with system events (event_1, event_2, event_3, and event_4) that occur at different times. In the illustrated example, event_1-event_4 occur in sequence, with event_1 being the first event. As shown in FIG. 4B, each event is stored as entity information 452, with each event, including a unique entity identifier (e.g., "ENTITY_1"), being matched with one or more invalidity codes 454 to represent a system event conflict, or an indication that no error occurred.

Figure 5:
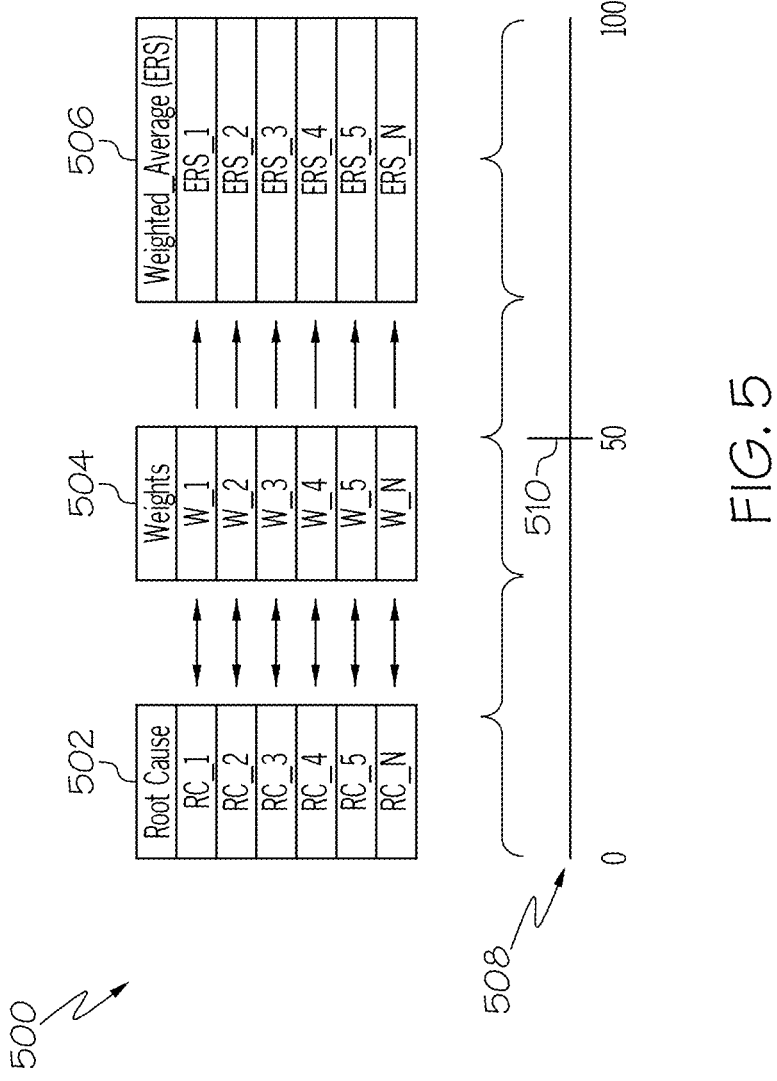
FIG. 5 illustrates a configuration for indicating a likelihood of a system error.

FIG. 5 illustrates a configuration 500 that allows a computing system and/or assists an auditor or other user to determine the likelihood that a query should be denied. For example, configuration 500 indicates when approval of the query is likely to result in a system error. In some configurations, this indication is in the form of signals between components of analysis platform 102 (e.g., between invalidity cause analyzer 120 and entity-cause matcher 122). In some configurations, the indication is presented on a display, such as a numerical or qualitative representation, as described below.

The likelihood of a system error is represented with an error risk score ("ERS"). As shown in configuration 500, errors risk scores (ERS_1 through ERS_N) are determined in the form of weighted averages 506, each weight average being determined according to a root cause 502 (e.g., one or more of the above-described invalidity codes) and a weight 504 associated with the root cause 502.

In some aspects, different root causes 502 or invalidity codes have a higher likelihood that the error is caused by actions of the entity itself. For example, for the root causes 502 associated with timestamp errors or coverage errors (see causes 404 in FIG. 4A), the error often originates by the entity. Thus, the weight 504 associated with this cost is relatively high, resulting in a relatively high ERS weight average 506.

An example ERS score is represented on a scale of 0 to 100 in FIG. 5, and shown along an ERS scale 508. On ERS scale 508, three regions are identified, a first region beginning at the value 0. This first region represents a low ERS scores in which the error has a low likelihood of being caused by actions of the entity. A second region of ERS scale 508, in the center portion of scale 508, is associated with moderate ERS scores 506, including a neutral point 510. Scores above neutral point 510 are more likely to have been caused by the entity, while scores below neutral point 510 are more likely to have been caused by a downstream system (e.g., other interactions with front-end system 104). The third region of ERS scale 508 is associated with high ERS scores 506 at which a relatively high risk being caused by actions taken by the entity. High ERS scores 506, or scores greater than neutral point 510, are presented via event conflict notifier 126, if desired.

As described above, the systems and method described herein are applicable to, for example, device interactions (e.g., via one or more system drivers), memory interactions, storage interactions, HTTP communications, API calls, video communications, audio communications, messaging services, healthcare applications, and others. In the example of healthcare applications, narrative text may correspond to memo text, a user-documented exchange (e.g., via medical records, chat, e-mail, telephone conversation transcripts, etc.) for processing a claim at the provider level. In these configurations, a claim adjustment reason code ("CARC") and/or a remittance advice remark code ("RARC") could be used to define invalidity codes 402, 454, or invalidity causes 404 and used for computing one or more ERS scores 506.

In general, any process or operation discussed in this disclosure is understood to be computer-implementable, such as the processes illustrated in FIGS. 2 and 3 are performed by one or more processors of a computer system as described herein. A process or process step performed by one or more processors is also referred to as an operation. The one or more processors are configured to perform such processes by having access to instructions (e.g., software or computer-readable code) that, when executed by one or more processors, cause one or more processors to perform the processes. The instructions are stored in a memory of the computer system. A processor is a central processing unit (CPU), a graphics processing unit (GPU), or any suitable type of processing unit.

A computer system, such as a system or device implementing a process or operation in the examples above, includes one or more computing devices. One or more processors of a computer system are included in a single computing device or distributed among a plurality of computing devices. One or more processors of a computer system are connected to a data storage device. A memory of the computer system includes the respective memory of each computing device of the plurality of computing devices.

Figure 6:
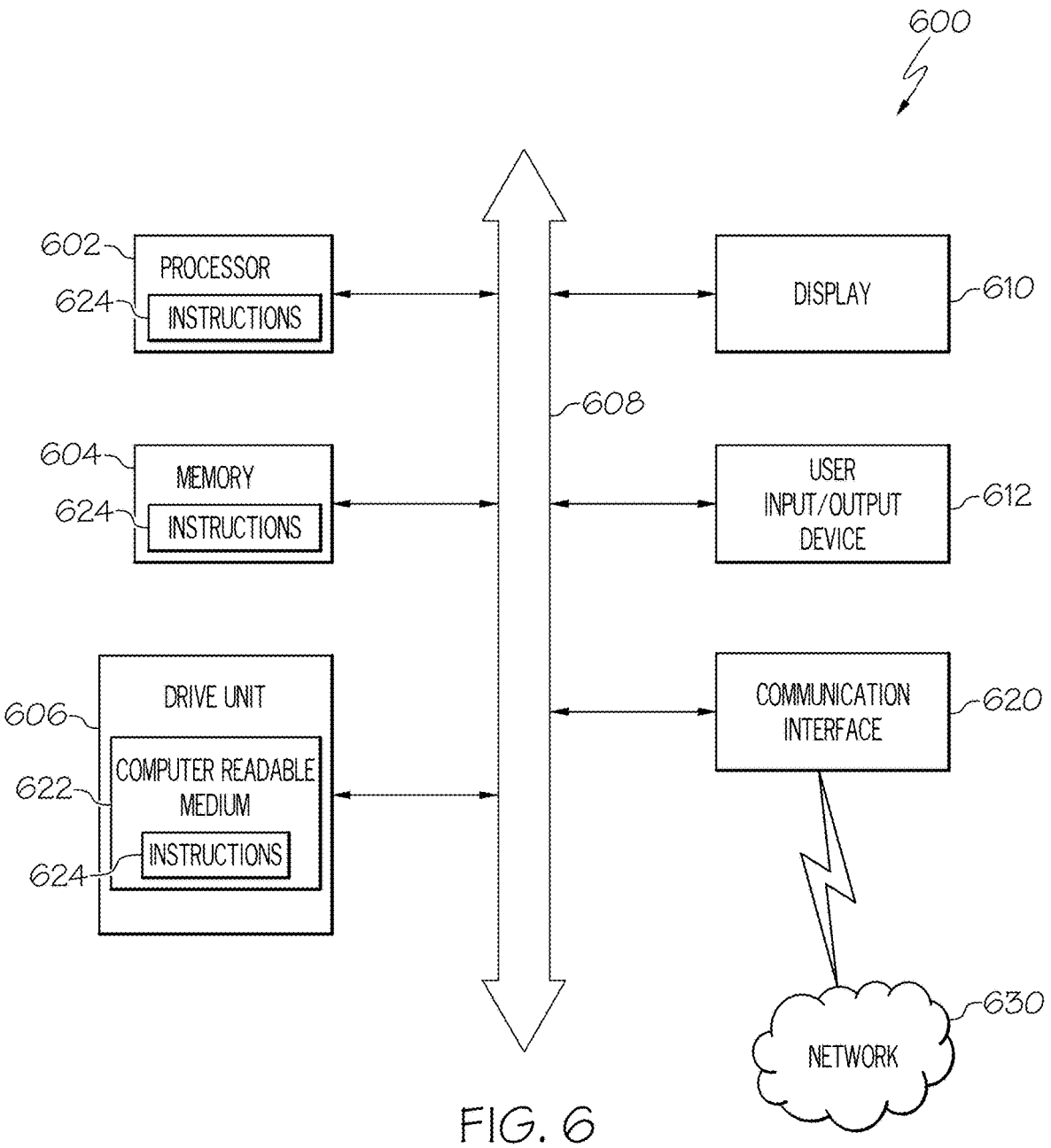
FIG. 6 illustrates an implementation of a computer system that executes techniques presented herein.

FIG. 6 illustrates an implementation of a computer system that executes techniques presented herein. The computer system 600 includes a set of instructions that are executed to cause the computer system 600 to perform any one or more of the methods or computer based functions disclosed herein. The computer system 600 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 600 operates in the capacity of a server or as a client user computer in a server-client user network environment, or as a peer computer system in a peer-to-peer (or distributed) network environment. The computer system 600 is also implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 is implemented using electronic devices that provide voice, video, or data communication. Further, while the computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 includes a processor 602, e.g., a central processing unit (CPU), a graphics processing unit (GPU), or both. The processor 602 is a component in a variety of systems. For example, the processor 602 is part of a standard personal computer or a workstation. The processor 602 is one or more processors, digital signal processors, application specific integrated circuits, field programmable gate arrays, servers, networks, digital circuits, analog circuits, combinations thereof, or other now known or later developed devices for analyzing and processing data. The processor 602 implements a software program, such as code generated manually (i.e., programmed).

The computer system 600 includes a memory 604 that communicates via bus 608. Memory 604 is a main memory, a static memory, or a dynamic memory. Memory 604 includes, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. Memory 604 is an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts, or tasks illustrated in the figures or described herein are performed by processor 602 executing the instructions stored in memory 604. The functions, acts, or tasks are independent of the particular type of instruction set, storage media, processor, or processing strategy and are performed by software, hardware, integrated circuits, firmware, micro-code, and the like, operating alone or in combination. Likewise, processing strategies include multiprocessing, multitasking, parallel processing, and the like.

As shown, the computer system 600 further includes a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 acts as an interface for the user to see the functioning of the processor 602, or specifically as an interface with the software stored in the memory 604 or in the drive unit 606.

Additionally or alternatively, the computer system 600 includes an input/output device 612 configured to allow a user to interact with any of the components of the computer system 600. The input/output device 612 is a number pad, a keyboard, a cursor control device, such as a mouse, a joystick, touch screen display, remote control, or any other device operative to interact with the computer system 600.

The computer system 600 also includes the drive unit 606 implemented as a disk or optical drive. The drive unit 606 includes a computer-readable medium 622 in which one or more sets of instructions 624, e.g. software, is embedded. Further, the sets of instructions 624 embodies one or more of the methods or logic as described herein. Instructions 624 resides completely or partially within memory 604 and/or within processor 602 during execution by the computer system 600. The memory 604 and the processor 602 also include computer-readable media as discussed above.

In some systems, computer-readable medium 622 includes the set of instructions 624 or receives and executes the set of instructions 624 responsive to a propagated signal so that a device connected to network 630 communicates voice, video, audio, images, or any other data over network 630. Further, the sets of instructions 624 are transmitted or received over the network 630 via the communication port or interface 620, and/or using the bus 608. The communication port or interface 620 is a part of the processor 602 or is a separate component. The communication port or interface 620 is created in software or is a physical connection in hardware. The communication port or interface 620 is configured to connect with the network 630, external media, display 610, or any other components in the computer system 600, or combinations thereof. The connection with network 630 is a physical connection, such as a wired Ethernet connection, or is established wirelessly as discussed below. Likewise, the additional connections with other components of the computer system 600 are physical connections or are established wirelessly. Network 630 alternatively be directly connected to the bus 608.

While the computer-readable medium 622 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that causes a computer system to perform any one or more of the methods or operations disclosed herein. The computer-readable medium 622 is non-transitory, and may be tangible.

The computer-readable medium 622 includes a solid-state memory such as a memory card or other package that houses one or more non-volatile read-only memories. The computer-readable medium 622 is a random-access memory or other volatile re-writable memory. Additionally or alternatively, the computer-readable medium 622 includes a magneto-optical or optical medium, such as a disk or tapes or other storage device to capture carrier wave signals such as a signal communicated over a transmission medium. A digital file attachment to an e-mail or other self-contained information archive or set of archives is considered a distribution medium that is a tangible storage medium. Accordingly, the disclosure is considered to include any one or more of a computer-readable medium or a distribution medium and other equivalents and successor media, in which data or instructions are stored.

In an alternative implementation, dedicated hardware implementations, such as application specific integrated circuits, programmable logic arrays, and other hardware devices, is constructed to implement one or more of the methods described herein. Applications that include the apparatus and systems of various implementations broadly include a variety of electronic and computer systems. One or more implementations described herein implement functions using two or more specific interconnected hardware modules or devices with related control and data signals that are communicated between and through the modules, or as portions of an application-specific integrated circuit. Accordingly, the present system encompasses software, firmware, and hardware implementations.

Computer system 600 is connected to network 630. Network 630 defines one or more networks including wired or wireless networks. The wireless network is a cellular telephone network, an 802.10, 802.16, 802.20, or WiMAX network. Further, such networks include a public network, such as the Internet, a private network, such as an intranet, or combinations thereof, and utilizes a variety of networking protocols now available or later developed including, but not limited to TCP/IP based networking protocols. Network 630 includes wide area networks (WAN), such as the Internet, local area networks (LAN), campus area networks, metropolitan area networks, a direct connection such as through a Universal Serial Bus (USB) port, or any other networks that allows for data communication. Network 630 is configured to couple one computing device to another computing device to enable communication of data between the devices. Network 630 is generally enabled to employ any form of machine-readable media for communicating information from one device to another. Network 630 includes communication methods by which information travels between computing devices. Network 630 is divided into sub-networks. The sub-networks allow access to all of the other components connected thereto or the sub-networks restrict access between the components. Network 630 is regarded as a public or private network connection and includes, for example, a virtual private network or an encryption or other security mechanism employed over the public Internet, or the like.

In accordance with various implementations of the present disclosure, the methods described herein are implemented by software programs executable by a computer system. Further, in an example, non-limited implementation, implementations can include distributed processing, component/object distributed processing, and parallel processing. Alternatively, virtual computer system processing can be constructed to implement one or more of the methods or functionality as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art.

Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. Further, as used herein, multiple occurrences of the phrase "the one or more processors" do not require that the associated steps or actions be performed with the same processor or the same set of processors. Steps or actions performed with "the one or more processors" may share one processor, share a plurality of processors, or share no processors. It will also be understood that the disclosure is not limited to any particular implementation or programming technique and that the disclosure is implemented using any appropriate techniques for implementing the functionality described herein. The disclosure is not limited to any particular programming language or operating system.

It should be appreciated that in the above description of example embodiments of the present disclosure, various features are sometimes grouped together in a single embodiment, figure, or description thereof for the purpose of streamlining the disclosure and aiding in the understanding of one or more of the various inventive aspects. This method of the present disclosure, however, is not to be interpreted as reflecting an intention that the claimed embodiments require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of the present disclosure.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the present disclosure.

In the description provided herein, numerous specific details are set forth. However, it is understood that embodiments of the present disclosure are practiced without these specific details. In other instances, well-known methods, structures and techniques have not been shown in detail in order not to obscure an understanding of this description.

Thus, while there has been described what are believed to be the preferred embodiments of the present disclosure, those skilled in the art will recognize that other and further modifications are made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure furthermore relates to the following aspects.

Example 1. A computer-implemented method comprising: receiving, by one or more processors, first query data associated with a first query, the first query data including a first unique entity identifier, identifying, by the one or more processors, a system error that is associated with the first unique entity identifier based on an indication that the first query was improperly approved, extracting, by the one or more processors, a cause of the system error from the first query data by applying one or more text-analyzing algorithms to narrative text included in the first query data, determining, by the one or more processors, a machine-readable invalidity code that corresponds to the cause of the system error by comparing the cause of the system error with a set of machine-readable invalidity codes, updating, by the one or more processors, a system error database with the first unique entity identifier and the machine-readable invalidity code as a first pair, and outputting, by the one or more processors, the first pair including the first unique entity identifier and the machine-readable invalidity code from the system error database, the first pair being configured to be processed by a front-end system for identifying a potential system error associated with second query data for a second query.

Example 2. The computer-implemented method of example 1, wherein the system error corresponds to erroneous information contained in the first query data associated with the first query.

Example 3. The computer-implemented method of example 1, wherein the system error corresponds to a timestamp error, the timestamp error being encoded in the machine-readable invalidity code.

Example 4. The computer-implemented method of example 1, wherein the system error corresponds to an entity identification error encoded in the machine-readable invalidity code, an entity authorization error encoded in the machine-readable invalidity code, or a precertification mismatch error encoded in the machine-readable invalidity code.

Example 5. The computer-implemented method of any of examples 1-4, further including determining a likelihood of a system error with an error risk score, the error risk score representing a probability that the potential system error is associated with an action taken by an entity associated with the first entity identifier.

Example 6. The computer-implemented method of any of examples 1-5, further including causing a display of a notification corresponding to the potential system error, by outputting the first pair, the first pair being configured to be processed to determine that the second query data of the potential system error includes a second unique entity identifier of a second pair that matches the first unique entity identifier of the first pair.

Example 7. The computer-implemented method of any of examples 1-6, wherein extracting the cause of the system error further includes applying one or more algorithms for removing narrative text noise and outputting a summary of the narrative text, the one or more text-analyzing algorithms being applied to the summary of the narrative text.

Example 8. The computer-implemented method of any of examples 1-7, wherein the cause of the system error is identified using a natural language processing algorithm.

Example 9. A system, comprising: one or more processors of a computing system, and at least one non-transitory computer readable medium storing instructions which, when executed by the one or more processors, cause the one or more processors to perform operations comprising: receiving first query data associated with a first query, the first query data including a first unique entity identifier, identifying a system error that is associated with the first unique entity identifier based on an indication that the first query was improperly approved, extracting the cause of the system error from the first query data by applying one or more text-analyzing algorithms to narrative text included in the first query data, determining a machine-readable invalidity code that corresponds to the cause of the system error by comparing the cause of the system error with a set of machine-readable invalidity codes, and updating a system error database with the first unique entity identifier and the machine-readable invalidity code as a first pair; and outputting the first pair including the first unique entity identifier and the machine-readable invalidity code from the system error database, the first pair being configured to be processed by a front-end system for identifying a potential system error associated with second query data for a second query.

Example 10. The system of example 9, wherein the system error corresponds to erroneous information contained in the first query data associated with the first query.

Example 11. The system of example 9, wherein the system error corresponds to a timestamp error, the timestamp error being encoded in the machine-readable invalidity code.

Example 12. The system of example 9, wherein the system error corresponds to an entity identification error encoded in the machine-readable invalidity code, an entity authorization error encoded in the machine-readable invalidity code, or a precertification mismatch error encoded in the machine-readable invalidity code.

Example 13. The system of any of examples 9-12, wherein the operations further include determining a likelihood of a system error with an error risk score, the error risk score representing a probability that the potential system error is associated with an action taken by an entity associated with the first entity identifier.

Example 14. The system of any of examples 9-13, wherein the operations further include causing a display of a notification corresponding to the potential system error, by outputting the first pair, the first pair being configured to be processed to determine that the second query data of the potential system error includes a second unique entity identifier of a second pair that matches the first unique entity identifier of the first pair.

Example 15. The system of any of examples 9-14, wherein extracting the cause of the system error further includes applying one or more algorithms for removing narrative text noise and outputting a summary of the narrative text, the one or more text-analyzing algorithms being applied to the summary of the narrative text.

Example 16. The system of any of examples 9-15, wherein the cause of the system error is identified using a natural language processing algorithm.

Example 17. A non-transitory computer readable medium, the non-transitory computer readable medium storing instructions which, when executed by one or more processors of a computing system, cause the one or more processors to perform operations comprising: receiving first query data associated with a first query, the first query data including a first unique entity identifier, identifying a system error that is associated with the first unique entity identifier based on an indication that the first query was improperly approved, extracting cause of the system error from the first query data by applying one or more text-analyzing algorithms to narrative text included in the first query data, determining a machine-readable invalidity code that corresponds to the cause of the system error by comparing the cause of the system error with a set of machine-readable invalidity codes, and updating a system error database with the first unique entity identifier and the machine-readable invalidity code as a first pair; and outputting the first pair including the first unique entity identifier and the machine-readable invalidity code from the system error database, the first pair being configured to be processed by a front-end system for identifying a potential system error associated with second query data for a second query.

Example 18. The non-transitory computer readable medium of example 17, wherein the system error corresponds to erroneous information contained in the first query data associated with the first query.

Example 19. The non-transitory computer readable medium of example 17, wherein the system error corresponds to a timestamp error, the timestamp error being encoded in the machine-readable invalidity code.

Example 20. The non-transitory computer readable medium of example 17, wherein the system error corresponds to an entity identification error encoded in the machine-readable invalidity code, an entity authorization error encoded in the machine-readable invalidity code, or a precertification mismatch error encoded in the machine-readable invalidity code.

What is claimed is:

1. A computer-implemented method comprising:
receiving, by one or more processors, first query data associated with a first query, the first query data including a first unique entity identifier;
determining, by the one or more processors, that the first query was approved improperly;

identifying, by the one or more processors, a system error that is associated with the first unique entity identifier based on the determination that the first query was improperly approved;

extracting, by the one or more processors, a cause of the system error from the first query data by applying one or more text-analyzing algorithms to narrative text included in the first query data;

determining, by the one or more processors, a machine-readable invalidity code that corresponds to the cause of the system error by comparing the cause of the system error with a set of machine-readable invalidity codes;

updating, by the one or more processors, a system error database with the first unique entity identifier and the machine-readable invalidity code as a first pair; and outputting, by the one or more processors, the first pair including the first unique entity identifier and the machine-readable invalidity code from the system error database, causing a front-end system to identify a potential system error associated with second query data for a second query by:

identifying the first unique identifier, which is included in the first pair, in the second query data; and identifying the potential system error based on an association between the second query data and the machine-readable invalidity code in the first pair.

2. The computer-implemented method of claim 1, wherein the system error corresponds to erroneous information contained in the first query data associated with the first query.

3. The computer-implemented method of claim 1, wherein the system error corresponds to a timestamp error, the timestamp error being encoded in the machine-readable invalidity code.

4. The computer-implemented method of claim 1, wherein the system error corresponds to an entity identification error encoded in the machine-readable invalidity code, an entity authorization error encoded in the machine-readable invalidity code, or a precertification mismatch error encoded in the machine-readable invalidity code.

5. The computer-implemented method of claim 1, further including determining a likelihood of a system error with an error risk score, the error risk score representing a probability that the potential system error is associated with an action taken by an entity associated with the first entity identifier.

6. The computer-implemented method of claim 1, further including causing a display of a notification corresponding to the potential system error.

7. The computer-implemented method of claim 1, wherein extracting the cause of the system error further includes applying one or more algorithms for removing narrative text noise and outputting a summary of the narrative text, the one or more text-analyzing algorithms being applied to the summary of the narrative text.

8. The computer-implemented method of claim 1, wherein the cause of the system error is identified using a natural language processing algorithm.

9. A system comprising:

one or more processors of a computing system; and at least one non-transitory computer readable medium storing instructions which, when executed by the one or more processors, cause the one or more processors to perform operations comprising:

receiving first query data associated with a first query, the first query data including a first unique entity identifier;

determining that the first query was approved improperly;

identifying a system error that is associated with the first unique entity identifier based on the determination that the first query was improperly approved;

extracting the cause of the system error from the first query data by applying one or more text-analyzing algorithms to narrative text included in the first query data;

determining a machine-readable invalidity code that corresponds to the cause of the system error by comparing the cause of the system error with a set of machine-readable invalidity codes;

updating a system error database with the first unique entity identifier and the machine-readable invalidity code as a first pair; and outputting the first pair including the first unique entity identifier and the machine-readable invalidity code from the system error database, causing a front-end system to identify a potential system error associated with second query data for a second query by:

identifying the first unique identifier, which is included in the first pair, in the second query data; and identifying the potential system error based on an association between the second query data and the machine-readable invalidity code in the first pair.

10. The system of claim 9, wherein the system error corresponds to erroneous information contained in the first query data associated with the first query.

11. The system of claim 9, wherein the system error corresponds to a timestamp error, the timestamp error being encoded in the machine-readable invalidity code.

12. The system of claim 9, wherein the system error corresponds to an entity identification error encoded in the machine-readable invalidity code, an entity authorization error encoded in the machine-readable invalidity code, or a precertification mismatch error encoded in the machine-readable invalidity code.

13. The system of claim 9, wherein the operations further include determining a likelihood of a system error with an error risk score, the error risk score representing a probability that the potential system error is associated with an action taken by an entity associated with the first entity identifier.

14. The system of claim 9, wherein the operations further include causing a display of a notification corresponding to the potential system error.

15. The system of claim 9, wherein extracting the cause of the system error further includes applying one or more algorithms for removing narrative text noise and outputting a summary of the narrative text, the one or more text-analyzing algorithms being applied to the summary of the narrative text.

16. The system of claim 9, wherein the cause of the system error is identified using a natural language processing algorithm.

17. At least one non-transitory computer readable medium, the at least one non-transitory computer readable medium storing instructions which, when executed by one or more processors of a computing system, cause the one or more processors to perform operations comprising:

receiving first query data associated with a first query, the first query data including a first unique entity identifier;

determining that the first query was approved improperly;

identifying a system error that is associated with the first unique entity identifier based on the determination that the first query was improperly approved;

extracting cause of the system error from the first query data by applying one or more text-analyzing algorithms to narrative text included in the first query data;

determining a machine-readable invalidity code that corresponds to the cause of the system error by comparing the cause of the system error with a set of machine-readable invalidity codes;

updating a system error database with the first unique entity identifier and the machine-readable invalidity code as a first pair; and outputting the first pair including the first unique entity identifier and the machine-readable invalidity code from the system error database, causing a front-end system to identify a potential system error associated with second query data for a second query by:

identifying the first unique identifier, which is included in the first pair, in the second query data; and identifying the potential system error based on an association between the second query data and the machine-readable invalidity code in the first pair.

18. The at least one non-transitory computer readable medium of claim 17, wherein the system error corresponds to erroneous information contained in the first query data associated with the first query.

19. The at least one non-transitory computer readable medium of claim 17, wherein the system error corresponds to a timestamp error, the timestamp error being encoded in the machine-readable invalidity code.

20. The at least one non-transitory computer readable medium of claim 17, wherein the system error corresponds to an entity identification error encoded in the machine-readable invalidity code, an entity authorization error encoded in the machine-readable invalidity code, or a pre-certification mismatch error encoded in the machine-readable invalidity code.

* * * * *